United States Patent [19]

Dudley

[11] Patent Number: 4,659,273
[45] Date of Patent: Apr. 21, 1987

[54] LUG ATTACHMENT

[75] Inventor: Daniel P. Dudley, Jacksonville, Fla.

[73] Assignee: Trailer Marine Transport, Jacksonville, Fla.

[21] Appl. No.: 796,110

[22] Filed: Nov. 8, 1985

[51] Int. Cl.⁴ .............................................. F16B 41/00
[52] U.S. Cl. .................... 411/373; 411/429; 411/433; 411/910; 70/232
[58] Field of Search ............... 411/427, 371, 373, 374, 411/429, 431, 910, 432, 433; 70/232, 229, 230, 231

[56] References Cited

U.S. PATENT DOCUMENTS

| 750,675 | 1/1904 | Michelin | 411/432 |
|---|---|---|---|
| 1,475,907 | 11/1923 | Volman | 411/433 |
| 2,367,480 | 1/1945 | Beswick | 411/433 |
| 4,324,516 | 4/1982 | Sain | 411/910 X |
| 4,427,326 | 1/1984 | Hobson | 70/231 X |
| 4,462,731 | 7/1984 | Rovinsky | 411/433 |
| 4,521,146 | 6/1985 | Wharton | 411/910 X |

FOREIGN PATENT DOCUMENTS 394298  11/1908  France .................. 411/433

Primary Examiner—Gary L. Smith
Assistant Examiner—Adrian H. Whitcomb, Jr.
Attorney, Agent, or Firm—Ernest M. Anderson

[57] ABSTRACT

A lug attachment for detecting the removal of a wheel comprising a frangible shroud and an internally threaded member for attaching said shroud to the lug of a wheel mounting plate. The threaded member comprises a pair of split sleeve sections that laterally flex for engagement with the threads of a lug by an axial thrust. Thereafter, an axial thrust of said shroud clamps and secures the threaded member onto the lugs. Means formed on said shroud retains the threaded member in its axial position of attachment to a lug and prevents removal except by breakage.

9 Claims, 6 Drawing Figures

U.S. Patent  Apr. 21, 1987  Sheet 1 of 2  4,659,273
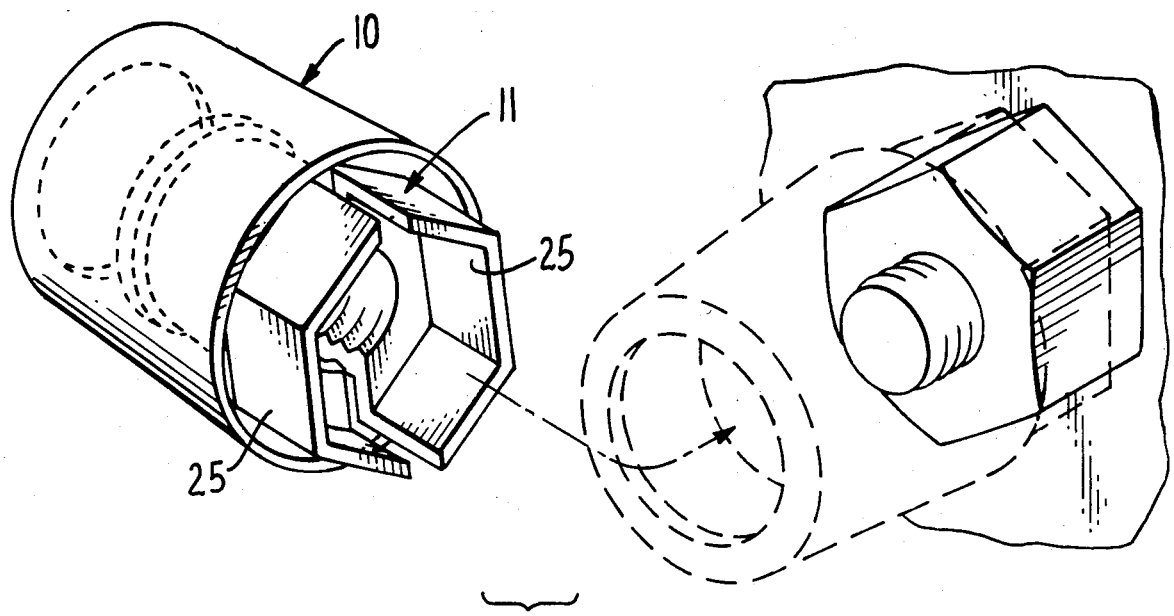
FIG. 1
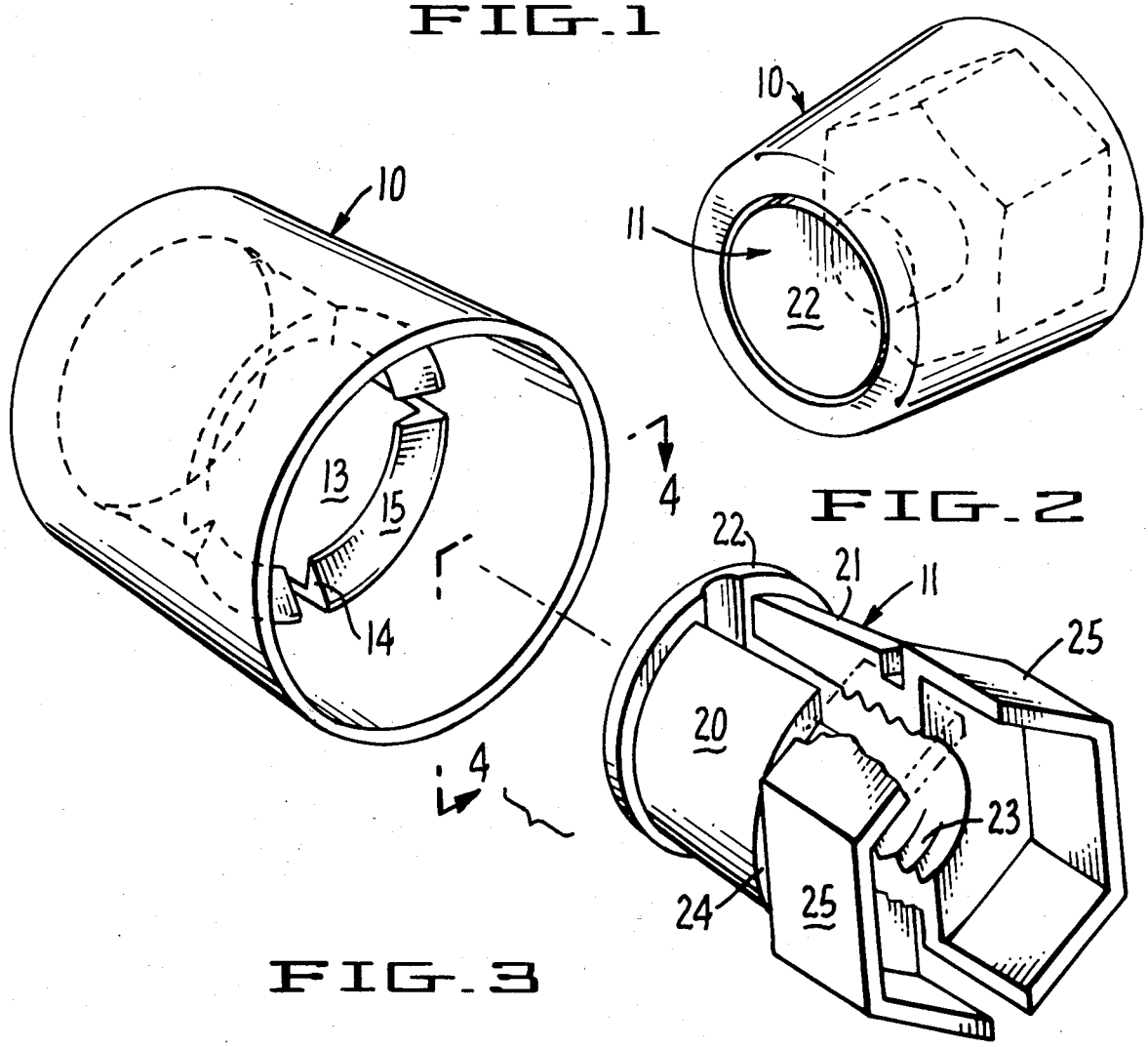
FIG. 2
FIG. 3

LUG ATTACHMENT

This invention relates generally to seals and protective devices and more particularly to an attachment for detecting the removal of a vehicle wheel. Devices of this kind have been previously marketed, as shown and described in U.S. Pat. No. 4,324,516. Such attachments are so constructed that they cannot be removed from the lug of a wheel mounting plate except by breakage, the appearance of breakage indicating that the associated wheel may have been removed from the vehicle. This fact is of importance to the owners of vehicles which are either rented or consigned to others. It is also important in determining whether the wheel of a vehicle has been removed during transit, as during shipments overseas.

The lug attachment described herein and forming a preferred embodiment of the present invention is similar to that described in U.S. Pat. No. 4,324,516 in that it comprises a frangible shroud having a skirt for covering the lug nut of a wheel and means for securing the shroud to the lug of a wheel mounting plate. Unlike the prior art, however, the present invention provides an attachment that consists of a two-piece assembly that may be affixed to a lug by an axial thrust without the use of tools.

In brief, the present invention comprises a frangible shroud or spinner and an internally threaded member or nut. The assembly is applied to the lug of a wheel mounting plate by applying an axial thrust, first to the threaded member, as to engage its threaded surface with the threads of the lug, and then applying an axial thrust to the shroud, moving the shroud axially relative to the threaded member into a position of secured attachment.

A primary object of the present invention is to provide an improvement in a lug attachment of the kind described that may be attached to a lug without the use of tools.

A second object of the invention is to provide a lug attachment that may be affixed manually to a lug by applying an axial thrust.

A still further object is to provide a lug attachment that is delivered to the prospective user as a unitary two-piece assembly, requiring no further assembly of pieces or parts by the user.

Other objects of the present invention will become apparent in view of the following detailed description.

In the drawings forming a part of this application and in which like parts are identified by like reference numerals throughout the same, FIG. 1 illustrates perspective views of a preferred embodiment of the invention, one view being of the attachment itself and the other view illustrating the attachment in a position of assembly to the lug of a wheel mounting plate;

FIG. 2 is a perspective view of the attachment engaged with the lug;

FIG. 3 is an exploded perspective view of the two part attachment;

Figure 4:
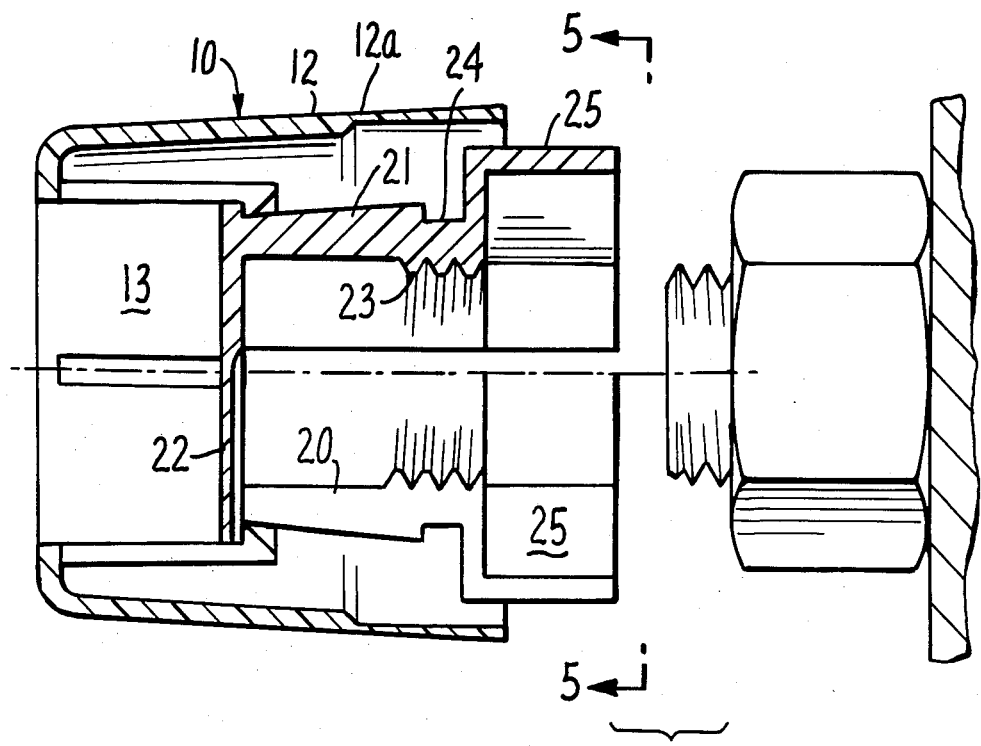
FIG. 4 is a quarter section of the attachment taken on lines 4—4 of FIG. 3 and a side elevation of a lug nut and lug to which the attachment is to be applied.
Figure 5:
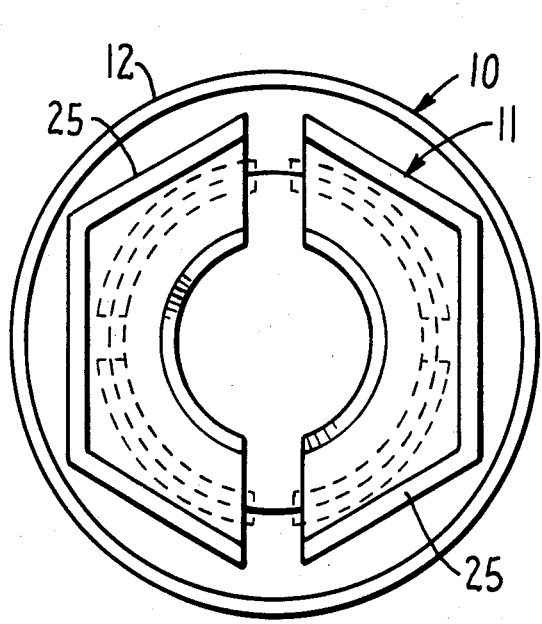
FIG. 5 is an end view of the attachment as viewed on lines 5—5 of FIG. 4.

Referring to the drawings, there is shown a preferred embodiment of a lug attachment and assembly comprising a shroud 10 and an internally threaded member 11. Both parts may be made of a resilient plastic and formed by an injection-molding process.

Shroud 10 defines an outer skirt 12 and an integral inner collar 13 formed by a set of three resilient and arcuate appendages. The end of each appendage has a lip 14 for retaining the threaded member 11 within the shroud in either one of two positions of axial assembly; and a camming surface 15 is formed on each lip to enhance radial spreading of the appendages as one end of threaded member 11 is moved axially into contact therewith and inserted into the collar.

Threaded member 11 essentially comprises a pair of split sleeve sections 20 and 21 integrally formed with a common end plate 22. The internal surface of each section provides one portion of an interrupted thread 23 that essentially corresponds to the thread of the lug to which it is to be affixed; and the external surface of each section is conically tapered outward from plate 22 to a recess 24. The lower ends 25 of each section provide one-half of a hexagonal cavity having the approximate size and shape of a lug nut. The two ends function as a housing that receive the hexagonal lug nut when the attachment is affixed to the associated lug.

Shroud 10 and threaded member 11 are axially assembled by inserting end plate 22 into the open end of skirt 12. As plate 22 contacts the inclined camming surfaces 15 of lips 14, the appendages which form collar 13 are spread apart, allowing plate 22 to be received within the collar. The appendages then return to their unstressed positions, capturing the end plate within the collar to form a two part assembly, as shown in FIG. 4.

Figure 6:
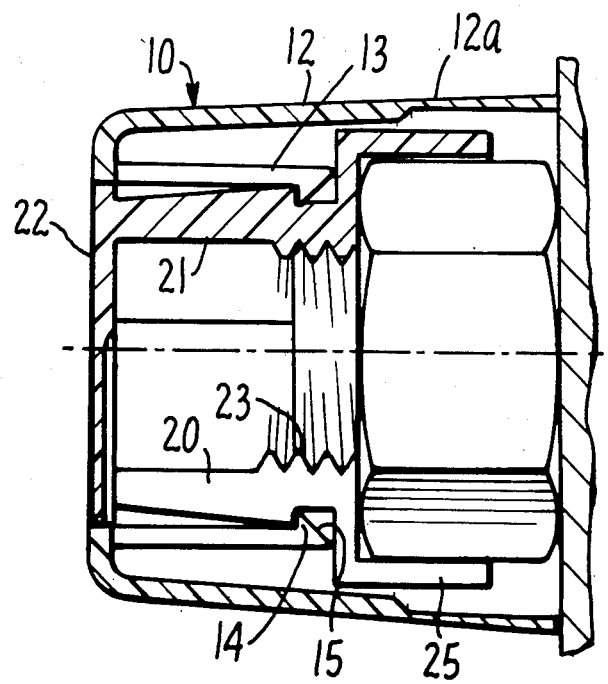
FIG. 6 is a center section of the attachment as applied to a wheel lug.

The resiliency of threaded member 11 is such that arcuate sections 20 and 21 may be flexed radially outward, allowing the threaded member to be axially thrust onto a lug without rotation and without damaging the threads. Recesses 24 are engaged with lips 14 of the shroud when the attachment is fully assembled and mounted to a lug as shown in FIG. 6.

The assembly as a whole is attached to the lug of a wheel mounting plate in the following manner: threaded member 11 is initially placed on the lug by an axial thrust applied to end plate 22, the threaded surfaces of collar 13 being spread apart to receive the lug. This position of attachment places the threads of threaded member 11 onto the the threads of the lug. Next, an axial thrust applied to the end of shroud 10 moves the shroud axially along threaded member 11, thereby causing the internal surfaces of collar 13 to contact tapered surfaces 23 and 24 and clamp sections 20 and 21 onto the threads of the lug.

In the position of attachment, the end of plate 22 occupies a position essentially coplanar with the end of shroud 10; lips 14 of collar 13 are received within recesses 24 of threaded member 11; the resiliency of collar 13 helps force and hold the threads of member 11 onto the threads of a lug; and the lower ends 25 of threaded member 11 receive and house the hexagonal lug nut. Thus, threaded member 11 cannot be rotated or unscrewed from the lug except with the lug nut itself. However, as long as shroud 10 is in place, there is no access for engaging and rotating threaded member 11. Such access can be had only by fracturing the shroud. The provision of a thin wall or section of weakness in the skirt 12, such as indicated at 12a, enhances such a fracture.

Although a preferred embodiment of the invention has been illustrated and described, various modifications and changes may be resorted to without departing from the spirit of the invention of the scope of the appended claims, and each of such modifications and changes is contemplated.

What is claimed is:

1. A lug attachment for detecting the removal of a wheel lug nut comprising:

a frangible shroud having an outer skirt and an internal collar;

an internally threaded member for attaching said shroud to a lug, said member being axially received within the internal collar of said shroud, said member having means for receiving and housing a wheel lug nut upon axial attachment to the lug of the wheel;

means formed on the internal collar of said shroud for clamping the threads of said threaded member onto threads of a lug as said shroud is moved axially relative thereto into a position of axial attachment; and means formed on the internal collar of said shroud for engaging and retaining said threaded member in its axial position of attachment to a lug.

2. The lug attachment of claim 1, said skirt being formed with a section of weakness to enhance fracture, whereby fracturing said skirt exposes the threaded member for removal.

3. The lug attachment of claim 1, the external surface of said threaded member being formed with a conical taper that cooperates with internal surfaces of said collar, axial movement of said shroud relative to said threaded member forcing the threads of said threaded member to grip the threads of a lug to which the attachment is applied.

4. The lug attachment of claim 1, said collar comprising a set of resilient and arcuate appendages, each appendage having a lip for engaging and retaining said threaded member within said shroud in a predetermined axial relationship.

5. The lug attachment of claim 4, the lip of each appendage being formed with a camming surface for radially enlarging said collar as one end of said threaded member is moved axially into contact therewith and inserted into said collar.

6. The lug attachment of claim 4, and means formed on said threaded member for engaging the lips formed on said appendages in two axially spaced positions of engagement, one of said positions engaging the shroud and threaded member as an assembly, the other position engaging the shroud and threaded member in secured attachment to the threaded end of a lug.

7. The lug attachment of claim 1, said threaded member comprising at least two arcuate sections integrally formed with a common end plate, said arcuate sections defining an interrupted internal thread that may be resiliently flexed and spread to receive axially the threaded end of a lug.

8. The lug attachment of claim 7, means formed on said threaded member and collar for retaining said threaded member within said collar in a predetermined axial relationship.

9. The lug attachment of claim 1, and means formed on said threaded member for receiving and housing a hexagonal nut upon axial attachment to the lug of a wheel, said means preventing relative rotation between said threaded member and the hexagonal nut.

* * * * *